(12) United States Patent
Johansson

(10) Patent No.: US 9,377,928 B2
(45) Date of Patent: Jun. 28, 2016

(54) LOCATION AND TIME BASED UNLOCKED ACTION

(75) Inventor: Fredrik Johansson, Malmo (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 305 days.

(21) Appl. No.: 14/110,930

(22) PCT Filed: Jul. 28, 2011

(86) PCT No.: PCT/EP2011/062994
§ 371 (c)(1),
(2), (4) Date: Oct. 10, 2013

(87) PCT Pub. No.: WO2012/143065
PCT Pub. Date: Oct. 26, 2012

(65) Prior Publication Data
US 2014/0053108 A1   Feb. 20, 2014

Related U.S. Application Data

(60) Provisional application No. 61/476,883, filed on Apr. 19, 2011.

(51) Int. Cl.
G06F 3/0481 (2013.01)
H04M 1/67 (2006.01)
H04M 1/725 (2006.01)

(52) U.S. Cl.
CPC ............ *G06F 3/04817* (2013.01); *H04M 1/67* (2013.01); *H04M 1/72572* (2013.01); *H04M 1/72566* (2013.01); *H04M 2250/22* (2013.01)

(58) Field of Classification Search
CPC ............ G06F 3/00; G06F 3/01; G06F 3/017; G06F 3/041; G06F 3/048; G06F 3/0481; G06F 3/0482; G06F 1/1626; G06F 3/0488; G06F 3/04845; G06F 3/04886; G06F 3/0484; G06F 3/04817; G06F 1/1613; H04M 1/72583; H04L 41/22

See application file for complete search history.

(56) References Cited

U.S. PATENT DOCUMENTS 5,821,933 A * 10/1998 Keller ................. G06F 3/04817
                                                                  707/999.009
5,907,327 A *  5/1999 Ogura ................... G06F 3/0486
                                                                  345/173

(Continued)

FOREIGN PATENT DOCUMENTS

CN    101098530 A    1/2008
CN    101371258 A    2/2009

(Continued)

OTHER PUBLICATIONS

International Search Report and Written Opinion for counterpart International Application No. PCT/EP2011/062994, mailed Dec. 2, 2011.

(Continued)

*Primary Examiner* — Xiomar L Bautista
(74) *Attorney, Agent, or Firm* — Renner, Otto, Boisselle & Sklar, LLP.

(57) ABSTRACT

A mobile electronic device is provided that comprises a display unit and a control unit configured to display at least a first and a second keylock icon associated with a unlock function on the mobile electronic device. The control unit may be configured to activate the display unit when unlocking the mobile electronic device and presenting a first start page in response to the first keylock icon being selected and a second start page in response to the second keylock icon being selected.

11 Claims, 4 Drawing Sheets

(56) References Cited

U.S. PATENT DOCUMENTS

| | | | | |
|---|---|---|---|---|
| 7,400,878 | B2* | 7/2008 | Hassan | G06F 21/31 |
| | | | | 455/410 |
| 7,453,443 | B2* | 11/2008 | Rytivaara | G06F 3/04883 |
| | | | | 345/173 |
| 9,152,309 | B1* | 10/2015 | Arrehn | G06F 3/04886 |
| 2004/0203895 | A1* | 10/2004 | Balasuriya | H04M 1/72577 |
| | | | | 455/456.1 |
| 2005/0197158 | A1* | 9/2005 | Silverbrook | B41J 3/445 |
| | | | | 455/556.2 |
| 2007/0150842 | A1 | 6/2007 | Chaudhri et al. | |
| 2010/0146384 | A1* | 6/2010 | Peev | H04M 1/673 |
| | | | | 715/255 |
| 2011/0047510 | A1 | 2/2011 | Yoon | |
| 2012/0053887 | A1* | 3/2012 | Nurmi | G06F 3/0485 |
| | | | | 702/150 |
| 2012/0084734 | A1* | 4/2012 | Wilairat | G06F 21/36 |
| | | | | 715/863 |

FOREIGN PATENT DOCUMENTS

| | | |
|---|---|---|
| CN | 101938568 A | 1/2011 |
| EP | 2 219 105 A1 | 8/2010 |
| JP | 2009-521753 | 6/2009 |
| JP | 2010-109789 | 5/2010 |

OTHER PUBLICATIONS

Chinese Office Action for corresponding Chinese patent application No. 2011800702422 dated Jan. 21, 2015.

* cited by examiner

LOCATION AND TIME BASED UNLOCKED ACTION

TECHNICAL FIELD

The present invention relates in general to a device and method for accessing actions or application at a specific location or time directly from the lock screen on mobile communication devices. The present invention also relates to mobile communication devices, such as mobile terminals, i.e mobile terminals, personal digital assistants, portable music players, smart phones and the like.

BACKGROUND

A variety of mobile communication devices, such as smart phones, are widely used today. The devices may be configured to perform various functions. Examples of such functions include data and voice communications, capturing images and video via a camera, playing music files among others. Some mobile communication devices include additional functionality which supports game playing.

There are ongoing efforts to support an increase the functionality of mobile communication devices. Such efforts include hardware and software improvements, as well as changes and improvements in structural and functional components of the mobile communication device. Many icons may be displayed on a display unit of a mobile communication device to provide for various functionalities and actions.

In many of these communication devices, the display unit is often brought into a locked state, or sleep mode, wherein the communication device is deactivated. Locking and unlocking of such mobile communication devices generally occurs by using dedicated mechanical buttons or a dedicated touchable area on the touch screen. When the mobile electronic device is unlocked the user arrives at a predefined view presented on the display. However, sometimes the user quickly would like to access a specific function or application at a specific location and time, such as the time schedule at the bus station. The normal way of doing this would be to unlock the communication device, select the application tray, open the browser, enter the web address of the service and check the time schedule. This operation may be time consuming and annoying to some users.

SUMMARY OF THE INVENTION

With the above description in mind, then, an aspect of some embodiments of the present invention is to provide an improved mobile communication device, which seeks to mitigate, alleviate or eliminate one or more of the above-identified deficiencies in the art and disadvantages singly or in any combination.

An aspect of the present invention relates to a mobile electronic device comprising a display unit, a control unit configured to display at least a first and a second keylock icon associated with a unlock function on the mobile electronic device. The control unit may be configured to activate the display unit when unlocking the mobile electronic device and presenting a first dynamic start page in response to the keylock icon being selected.

In one embodiment the first dynamic start page may be predefined.

In one embodiment the mobile electronic device may comprise a second non dynamic start page for being presented in response to the second keylock icon being presented.

In one embodiment may at least one application be presented on the first dynamic start page based on a position parameter received from a position means of the mobile electronic device. The at least one application may be predefined as a response of a user input.

In one embodiment may the at least one application be presented on the first dynamic start page based on a time parameter received from a time registration means of the mobile electronic device. The at least one application may be predefined as a response of a user input.

Another aspect of the present invention relates to a method of unlocking a mobile electronic device, wherein the mobile electronic device is in a locked state with a display unit of the mobile electronic device being deactivated. The method comprising the steps of: selecting one of at least a first and second keylock icon coupled to the display unit of the mobile electronic device, if an unlock event occurred, unlocking the mobile electronic device by activating the display unit. The method further comprising the steps of: presenting a first dynamic start page in response to selected keylock icon.

In one embodiment may the first dynamic start page be predefined.

In one embodiment the method may further comprise the steps of: customizing the first dynamic start page based on user input in response to the detecting of user input, adding applications based the user input to the first dynamic start page and selecting the range within the added application will be displayed.

The features of the above-mentioned embodiments can be combined in any combinations.

Some embodiments of the invention provide an improved device and method for quickly accessing predefined applications or actions at a specific location or time in response of unlocking the communication device.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Embodiments of the present invention relate, in general, to the field of mobile communication devices. A preferred embodiment relates to a portable communication device, such as a mobile phone, including one or more input devices. However, for the sake of clarity and simplicity, most embodiments outlined in this specification are related to mobile phones.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
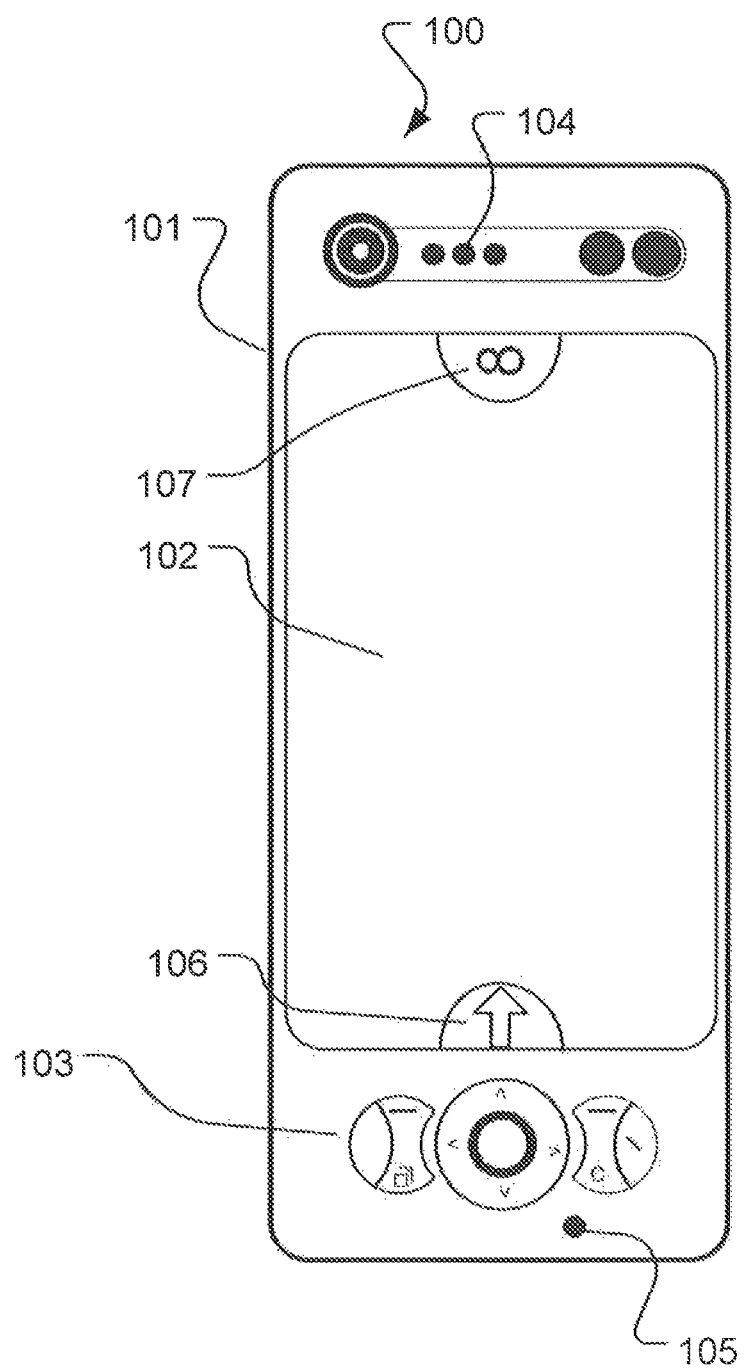
FIG. 1 shows a mobile communication device according to the invention.

A mobile communication device 100 according to an embodiment of the present invention is shown in FIG. 1. The mobile communication device may be configured with several commonly implemented components.

The device 100 may include a wireless communication unit (not shown) which includes one or more components which permit wireless communication between the device 100 and a wireless communication system or network within which the device 100 is located.

A broadcast receiving module (not shown) may also be included in the mobile communication device 100. The broadcast receiving module receives a broadcast signal and/or broadcast associated information from an external broadcast managing entity via a broadcast channel. Examples of broadcast associated information include information associated with a broadcast channel, a broadcast program, a broadcast service provider etc. The broadcast signal may be implemented, for example, as a TV broadcast signal, a radio broadcast signal and a data broadcast signal.

A wireless internet module (not shown) supports Internet access for the device 100. This module may be internally or externally coupled to the device 100.

A position-location module (not shown) identifies or otherwise obtains the location of the mobile communication device 100. This module may be implemented using, for example, global positioning system (GPS) components which cooperate with associated satellites, network components, and combinations thereof.

FIG. 1 shows an ordinary mobile communication device seen from the front. In this case the mobile phone 100 comprises a casing 101, a display area 102, and input means 103 for navigating among items displayed in the display area. The mobile phone typically also comprises a speaker 104 and a microphone 105. The input means for navigating 103 generates input data responsive to user manipulation of an associated input means. Examples of such input means include a touchpad, keypad, a dome switch, a touchpad, a jog wheel and a jog switch.

An output unit generally includes various components that support the output requirement of the mobile communication device 100. A display unit 102 is typically implemented to visually display information associated with the mobile communication device 100. On display unit 102, information, such as text, images, videos, and the like, as well as control elements, functions menus, or other graphical elements for operating the mobile communication device 100 may be displayed.

In one embodiment the display unit 102 may be configured as a touch panel working in cooperation with an input means 103, such as a touchpad. This configuration permits the display unit 102 to function both as an output unit and an input means. The touch panel includes a touch pad which is sensitive to a touch to a surface of the touch panel. The touch pad may be provided as a touch sensitive layer arranged as an upper surface of the display unit 102, but may also be integrated in the display unit 102.

The operation of the mobile electronic device 100 is controlled by a control unit comprising microprocessor and memory among others. The control unit controls the display unit 102 and interprets input signals received from the input unit 103. Control unit performs a particular function in response to a corresponding user input via a key pad or touch panel. The control unit may for example activate the display unit and operate the mobile communication device in response to receiving an input signal corresponding to an actuation of a particular key, keylock button, 106 on the key pad or particular graphical control element, keylock icon, 106 on the touch panel, by a user.

Figure 2:
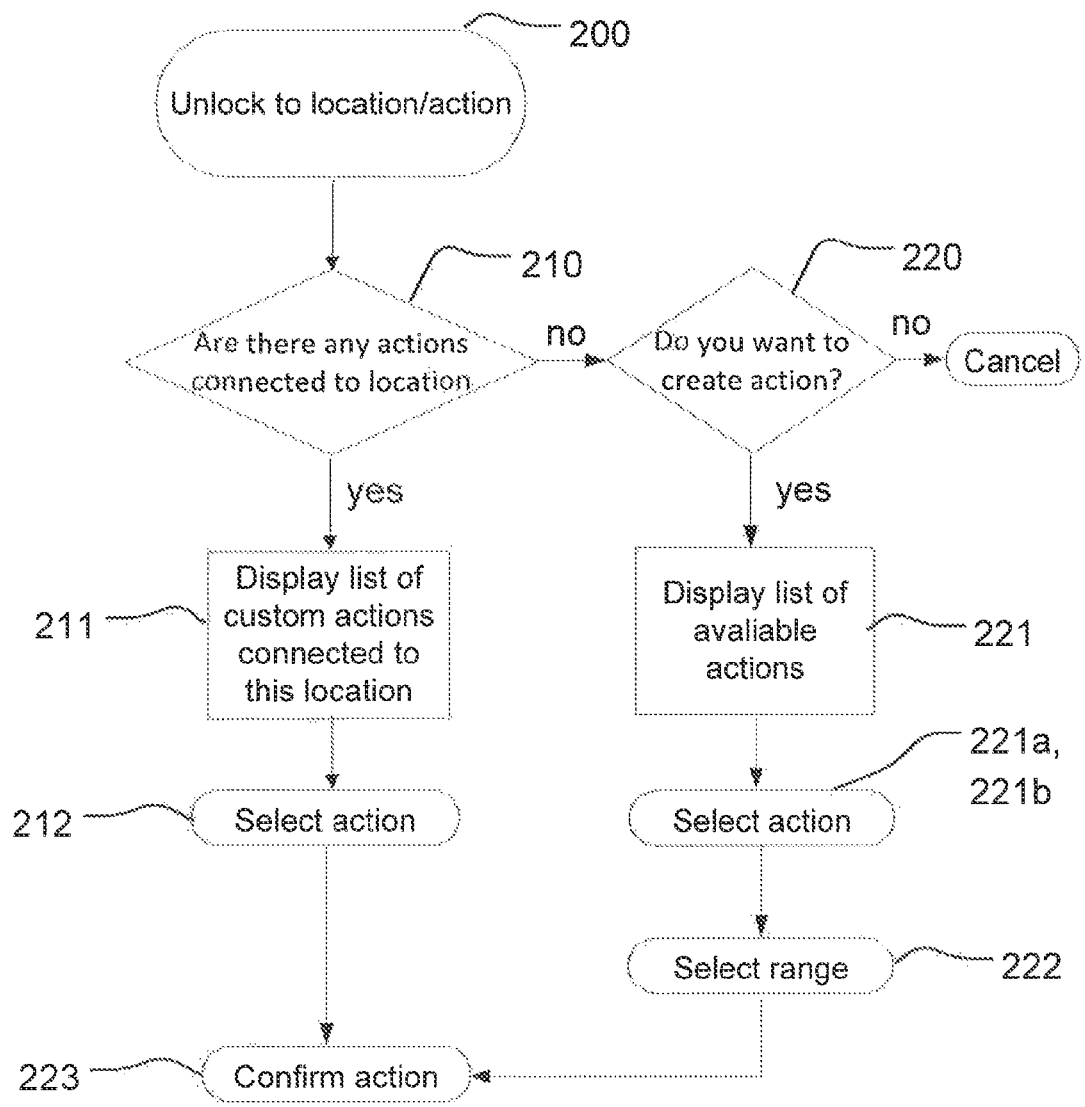
FIG. 2 is a flow diagram of an embodiment of a method according to the present invention.
Figure 3A:
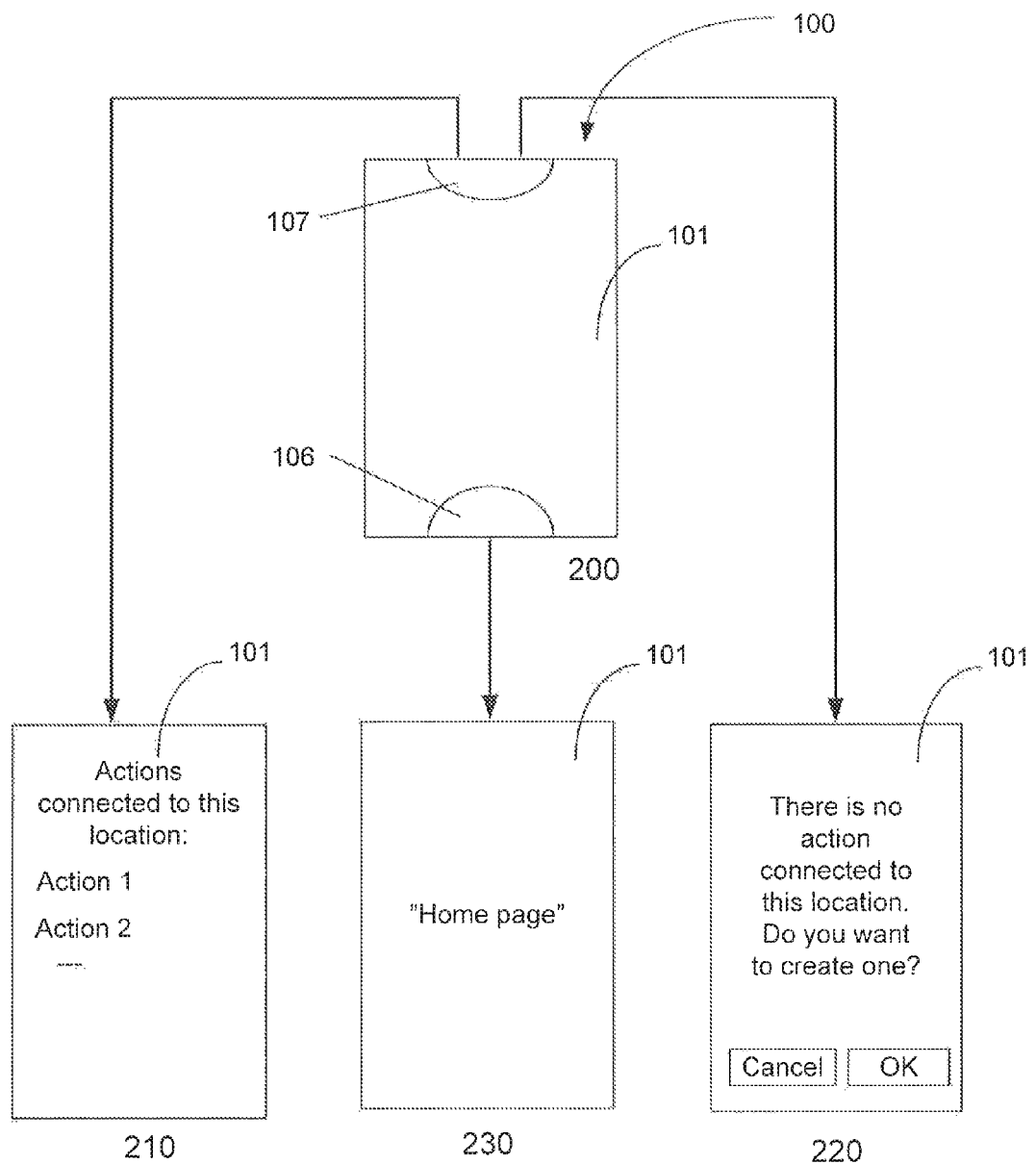
FIGS. 3a and 3b is a flow diagram of an embodiment of a method according to the present invention.

In one embodiment according to the invention a quicker and enhanced unlock function of the phone is provided. An additional keylock function is added, i.e. besides the normal unlock function, which direct the user to a home screen, as shown in FIG. 3a, step 230. A specific icon or button 107 on the display unit 102 would indicate an action assigned to this particular location, as shown in FIG. 2 or 3a, step 210, 220. The phone would recognize the current position and switch to the action assigned to these coordinates or a radius specified by the user, 211. The user can then unlock directly into that specific action, such as launch an application, open a web URL etc, 212.

FIG. 2 illustrates a location specific action being added, simply unlock to the icon, step 200 that indicates the dynamic (location or time) based trigger. The UI compare location and time information with a list of actions connected to that specific location and time and further display the list of recognized actions or applications related to the position, step 211 or prompt the user to create one, step 220. The user would then select what action to assign, step 221, 221a, 221b, within the radius it should work within from the location, step 222. Every time the user enters this radius/location, the dynamic unlock function will switch to this assigned action, i.e. if the user moves to another location with an action assigned to that location, the function would unlock to that particular action.

In one embodiment the software (SW) could recognize the behavior of the user. The user normally uses the same applications, apart from ad hoc use such as making or answering calls, at specific times, i.e. a user might play a specific game or checking emails when going by bus to work. The SW could recognize this behaviour and automatically assign a specific application to the unlock function. This would be the most likely action the user would perform at a specific point in time. Of course the normal unlock to home screen should still work.

FIG. 3a illustrates one embodiment of the display screen 101 of a mobile electronic device 100. The mobile device being operable in a locked state with a display screen of the mobile electronic device being deactivated is provided, 200. The mobile electronic device comprises at least a first pressure means 106, 107, coupled to the display screen 101 and adapted to detect an application of pressure to the first pressure means, a control unit adapted to determine if an unlock event occurred when the mobile electronic device is operating in the locked state and in response to the pressure means detecting an application of pressure to the display screen, and, if an unlock event occur, unlock the mobile electronic device by activating the display screen. The mobile electronic device is configured to activate a first dynamic start page, 210, 220 when unlocking the mobile electronic device and activating the display screen in response to the first pressure means, 107.

In one embodiment the first dynamic start page may be predefined, 210. The at least one application may be presented on the first dynamic start page based on a position parameter received from a position means of the mobile electronic device. The at least one application may also be presented on the first dynamic start page based on a time parameter received from a time registration means of the mobile electronic device. The at least one application may also predefined as a response of a user input.

In one embodiment the mobile electronic device may comprise a second non dynamic start page, 230. The mobile electronic device is configured to activate the second dynamic start page, 230 when unlocking the mobile electronic device and activating the display screen in response to the second pressure means, 106.

Figure 3B:
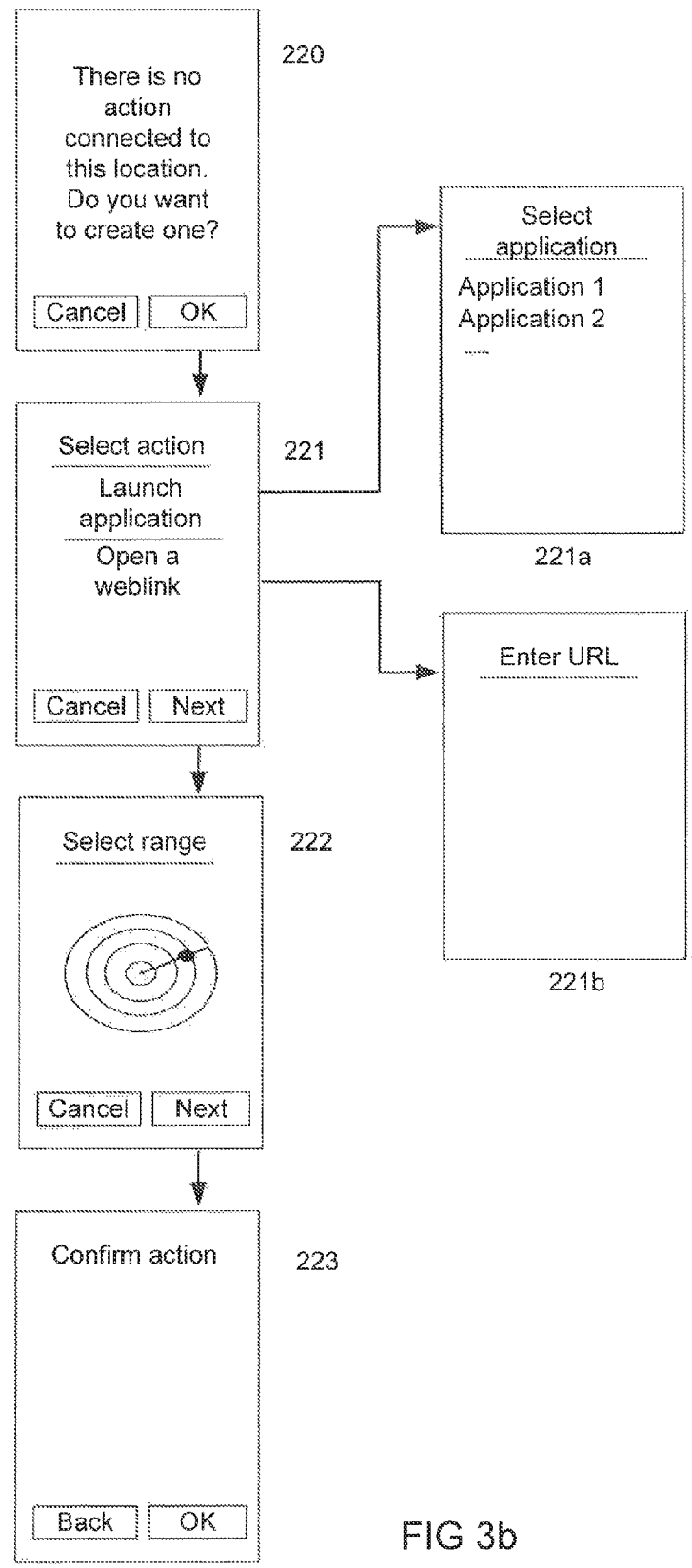

FIG. 3b illustrates one embodiment a method of unlocking the mobile electronic device, wherein the mobile electronic device is in a locked state with a display screen of the electronic device being deactivated is provided. The method may comprise the steps of detecting with one of at least a first and second pressure means, 106, 107 coupled to the display screen, 101, an application of pressure to one of at least a first and second pressure means, 106, 107, in response to the detecting of an application of pressure, determining if an unlock event occurred and if an unlock event occurred, unlocking the mobile electronic device by activating the display screen, 200. The method may further comprises the steps of determining which of at least a first and second start page to display, 210, 220, 230 when unlocking the mobile electronic device based on the detecting application of pressure on one of at least a first and second pressure means and presenting the determined start page on the display.

The method may further comprise the steps of customizing the first dynamic start page based on user input 221, in response to the detecting of user input, adding applications based the user input to the first dynamic start page. The user may select whether to enter specific application, 221a, or enter a specific webURL, 221b. The selected action may also be connected to a specific location, 222 and/or time. When the user has selected a specific action, the user confirms the action, 223, and the action is added and will be presented each time the user unlock the device by using the first pressure means at the specific location and/or at that specific time.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A mobile electronic device comprising:
   a display unit;
   a control unit configured to display at least a first and a second keylock icon on the display unit while the device is in a display-lock state and to activate the display unit in response to any of the at least first and second keylock icon being selected by a user; and
   a position unit for obtaining position parameters of the device, wherein at least one action associated with the obtained position parameters is displayed on a first dynamic start page presented on the display unit in response to the first keylock icon being selected by the user.

2. The device according to claim 1, wherein the first dynamic start page is predefined.

3. The device according to claim 1, wherein the mobile electronic device comprising a second non dynamic start page for being presented on the display unit in response to the second keylock icon being selected by the user.

4. The device according to claim 1, wherein the device further comprising a time registration unit for obtaining actual time, wherein at least one action associated with the obtained time is displayed on the first dynamic start page presented on the display unit in response to the first keylock icon being selected by the user.

5. The device according to claim 1, wherein the at least one action is predefined as a response of a user input.

6. The device according to claim 1, wherein the action is any of launching an application or opening a web URL.

7. A method of unlocking a mobile electronic device, wherein the mobile electronic device comprises a display unit and a control unit and wherein the mobile electronic device is in a display-locked state, the method comprising the steps of:
   selecting one of at least a first and second keylock icon presented on the display unit of the mobile electronic device;
   unlocking the mobile electronic device by activating the display unit when one of the at least first and second keylock icons is being selected by a user,
   wherein the method further comprising the steps of:
   obtaining a position parameter; and
   displaying at least one action associated with said obtained position parameters on a first dynamic start page presented on said display unit in response to the first keylock icon being selected by the user.

8. The method according to claim 7, wherein the first dynamic start page is predefined.

9. The method according to claim 7, wherein the method further comprising the steps of:
   customizing the first dynamic start page based on user input;
   in response to the detecting of user input, adding actions based the user input to the first dynamic start page; and
   selecting a range based on said obtained position parameter within which range the added actions is being displayed.

10. The method according to claim 7, wherein the at least one action is predefined as a response of a user input.

11. The method according to claim 7, wherein the action is any of launching an application or opening a web URL.

\* \* \* \* \*